J. D. CRARY.
ELECTRIC HAND GRILL.
APPLICATION FILED OCT. 10, 1917.
1,291,423.
Patented Jan. 14, 1919.
3 SHEETS—SHEET 1.
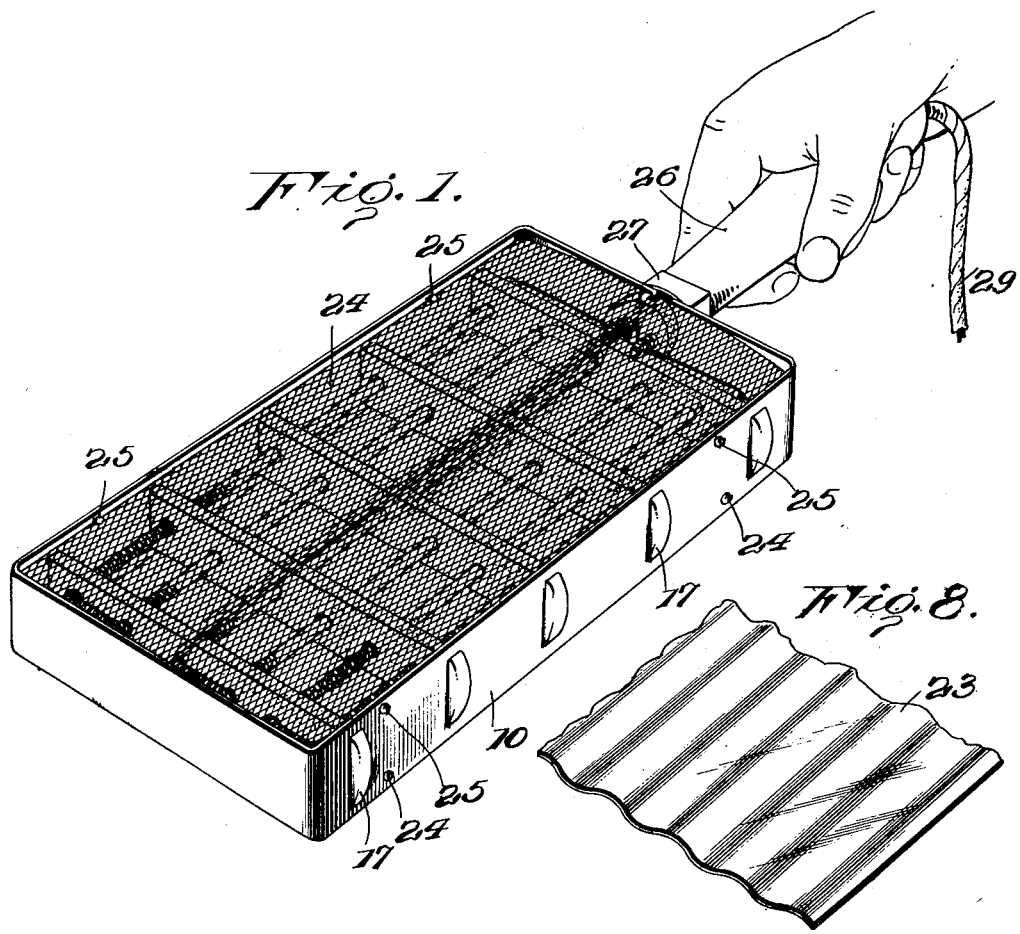
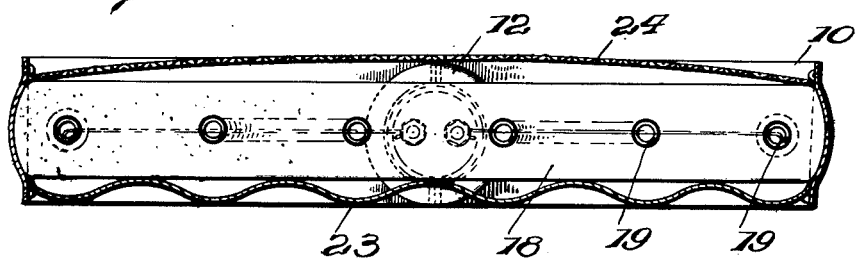
Inventor
J. D. Crary.
By
Attorneys.

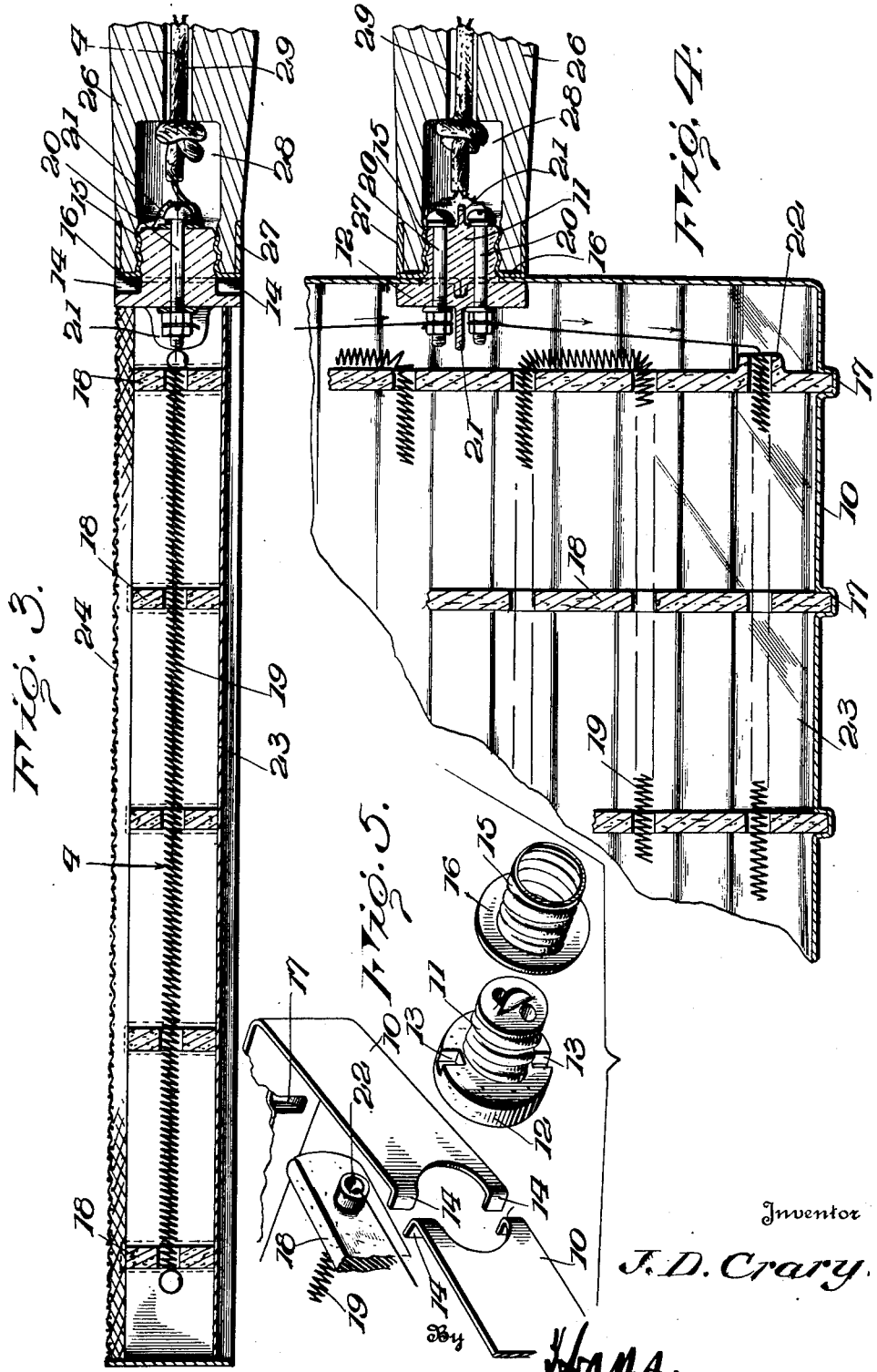

J. D. CRARY.
ELECTRIC HAND GRILL.
APPLICATION FILED OCT. 10, 1917.
1,291,423.
Patented Jan. 14, 1919.
3 SHEETS—SHEET 3.
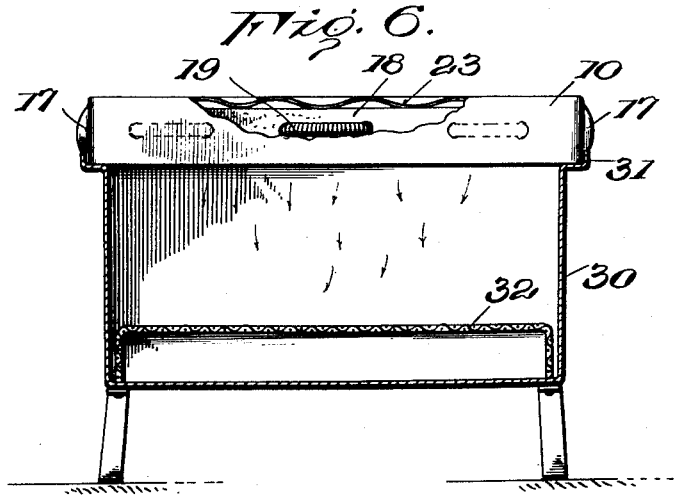
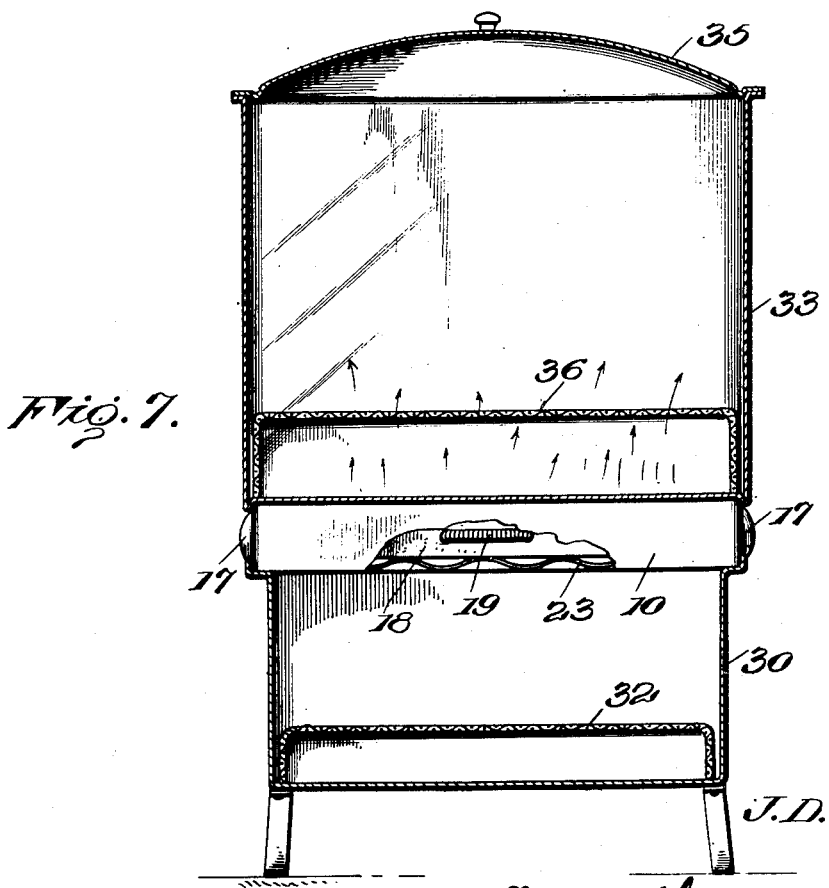
Inventor
J. D. Crary

UNITED STATES PATENT OFFICE.

JAY D. CRARY, OF ABERDEEN, WASHINGTON.

ELECTRIC HAND-GRILL.

1,291,423.

Specification of Letters Patent.  Patented Jan. 14, 1919.

Application filed October 10, 1917. Serial No. 195,826.

*To all whom it may concern:*

Be it known that I, JAY D. CRARY, a citizen of the United States, residing at Aberdeen, in the county of Grays Harbor and State of Washington, have invented certain new and useful Improvements in Electric Hand-Grills, of which the following is a specification.

This invention relates to an improved electric hand grill or heater and has as its primary object to provide a device of this character which may, without the likelihood of burning the hands, be readily picked up and moved from place to place, inverted, or otherwise manipulated for use in connection with various different cooking utensils to meet the different requirements of a practical electric heater for general cooking purposes.

The invention has as a further object to provide a hand grill of the above described character which may be used in connection with a broiler or which may be rested upon the broiler to provide a toaster with the broiler then forming a stand for the grill and wherein the grill may also be placed upon the broiler to be supported thereby for use in connection with a steamer.

And the invention has as a still further object to provide a grill which will be exceedingly simple in construction and at the same time thoroughly practical and wherein the device may be manufactured and assembled at minimum cost.

Other and incidental objects will appear as the description proceeds and in the drawings wherein I have illustrated the preferred embodiment of the invention and wherein similar reference characters designate corresponding parts throughout the several views.

Figure 1 is a perspective view of my improved hand grill showing the manner in which the device may be manipulated, Fig. 2 is a transverse sectional view more particularly illustrating the arrangement of the corrugated reflector employed for the heating unit of the device, Fig. 3 is a longitudinal sectional view particularly illustrating the mounting of the heating unit, Fig. 4 is a fragmentary sectional view taken on the line 4—4 of Fig. 3 and particularly showing the mounting of the terminal plug employed for connecting the ends of the split frame of the device, Fig. 5 is a fragmentary perspective view illustrating the manner in which the ends of the frame are formed to receive the ends of the terminal plug and showing the said plug and locking ring for the ends of the frame detached, Fig. 6 is a transverse sectional view showing the grill in connection with a broiler, Fig. 7 is a similar view showing the grill supported upon the broiler for heating a steamer, and Fig. 8 is a fragmentary perspective view illustrating a portion of the corrugated reflector for the heating unit of the device.

In carrying out the invention, I employ a preferably oblong resilient metal frame 10 which is, as shown in detail in Fig. 5 of the drawings, split at one end thereof at a point substantially midway between the sides of the frame. This frame is imperforate except at the ends thereof which are cut away to removably receive a terminal plug or connecting member 11. The plug 11 may be formed of any suitable insulating material and at its inner extremity is provided with a flange 12. Formed in the inner side face of the flange 12 are oppositely disposed notches 13 which are arranged to receive pairs of inwardly directed lugs 14 formed on the terminals of the frame 10. As particularly shown in Figs. 3 and 4 of the drawings, the plug 11 is fitted through the frame from the inner side thereof so that the flange 12 of the plug seats against the inner sides of the frame ends with the lugs 14 fitting within the notches 13 for connecting the frame at its extremities. Screw threaded upon the plug is a preferably metallic locking ring 15 provided at its inner end with an annular flange 16 to confront the flange 12 of the plug and engage the extremities of the frame upon the outer sides thereof. As will thus be clear, the ring 15 may be adjusted upon the plug 11 to tightly bind the lugs 14 of the frame within the notches of the plug and thus lock the ends of the frame together.

Formed in each of the side members of the frame is a series of longitudinally spaced oval sockets 17. These sockets are preferably pressed out from the inner side of the frame and mounted in corresponding sockets of the said series are a plurality of spaced cross slats 18 the terminals of which are curved, as shown in detail in Fig. 5 of the drawings, to fit within the said sockets. As in the instance of the plug 11, the slats 18 may also be formed of any suitable insulating material and threaded back and forth through the said slats is a coiled heating unit or wire 19 arranged in a plane substantially midway between the top and bottom edges of the frame. The ends of this heating unit are, as shown in Fig. 4 of the drawings, connected to spaced terminals 20 removably fitted through the plug 11 and insulated thereby with respect to each other as well as with respect to the frame 10. Between the terminals, the ends of the plug are formed with longitudinally projecting wings or webs 21 to obviate any possibility of the current jumping from one plug to the other. Furthermore, in order to space the extremities of the heating unit away from the intermediate portion thereof threaded through the slat at the inner end of the frame, the openings formed in the extremities of this slat are, as also particularly shown in Fig. 4, provided with suitable bosses 22.

Fitted within the lower open side of the frame is a reflector 23 removably held in position by a plurality of suitable lugs 24 preferably pressed in from the sides of the frame 10 to engage the edges of the reflector. The reflector 23 is preferably formed of suitable sheet metal and is corrugated longitudinally. This construction provides an arrangement whereby a greatly increased reflecting area will be obtained as compared with an ordinary flat reflector and preferably, the inner face of the reflector 23 is highly polished to thus more effectually reflect the heat from the heating unit toward the upper side of the grill. It has been found that by constructing this reflector of nickel and polishing the inner face thereof, highly satisfactory results are attained since the smooth bright surface thus presented by the inner face of the reflector will thus reflect a maximum amount of heat striking said reflector. To enhance this effect, the inner face of the frame is also preferably given a polished surface for refracting the heat inwardly therefrom and since the said frame is imperforate, loss of heat through lateral radiation will be reduced to a minimum. Furthermore, it has been found that by corrugating the reflector 23, the effectiveness thereof is increased in direct proportion to the consequently increased reflecting surface of the said reflector and, as shown in Fig. 2 of the drawings, the reflector is preferably so arranged that the longitudinal reaches of the heating unit 19 are disposed directly over the hollows of the reflector. The reflector is, therefore, provided with a curved surface arranged practically concentric to each of the reaches of the heating unit for thus refracting practically all of the heat waves radiated toward the reflector by the coils of the heating unit.

Removably fitted in the upper open side of the frame 10 is a preferably wire guard 24 which is transversely bowed between the sides of the frame and is engaged at its longitudinal edges beneath suitable lugs 25 pressed in from the sides of the frame. The longitudinal edges of this guard rest upon the upper edges of the slats 18 for effectually supporting the guard and the longitudinal edges of the reflector 23 also rest upon the said slats for a similar purpose. In this connection, it will be observed that the reflector and guard are interchangeable so that one or the other may be fitted in either side of the frame without the necessity of first locating a particular side thereof. This construction will, of course, add to the desirability of the device in practical use and will tend to facilitate the assembling of the device in the manufacture thereof.

Detachably connected with the frame 10 is a handle 26, the inner extremity of which is preferably squared and is equipped with a suitable ferrule 27. The handle 26 may be formed of wood or other approved material and at its inner extremity is bored out to provide a socket 28 screw threaded to engage the locking ring 15 for connecting the handle with the frame. This provides a very simple and convenient arrangement for mounting the handle and in this connection, attention is directed to the fact that the plug 11 not only provides a means for connecting the ends of the frame 10 but also as a support for the handle. Furthermore, the locking ring 15 not only provides a means for locking the ends of the frame in engagement with the plug but also provides a means for detachably securing the handle upon the frame. Fitted through the handle to extend into the socket 28 thereof is an electric cord 29, the circuit wires of which are connected with the inner extremities of the terminals 20. Current may thus be supplied from any suitable source to the heating unit 19.

It will therefore be seen that I provide a grill which is characterized by extreme structural simplicity. Furthermore, the device is of such nature that it may be readily manufactured and assembled. When assembling the device, the ends of the frame 10 are slightly sprung apart and the cross slats 18 inserted between the sides of the frame. The heating unit 19 is then threaded through the said slats. However, if preferred, the heating unit may be threaded through the slats before the said slats are placed in position upon the frame. After the slats are arranged in place, the plug 11 is fitted between the ends of the frame when the sides of the frame are sprung toward each other to resiliently clamp all of the cross slats within the frame and engage the lugs 14 within the notches 13 of the said plug. The ring 15 is then applied for locking the ends of the frame engaged with the plug. The ends of the heating unit may then be connected with the inner extremities of the terminals 20 and the circuit wires connected with the outer extremities of the said terminals when the handle may be applied and the reflector 23 and guard 24 fitted in position to complete the grill. Obviously, this operation of assembling the device therefore constitutes a very simple procedure and most important, an operation which may be performed at minimum expense.

Attention is now directed to the fact that by grasping the handle 26 in the manner illustrated in Fig. 1 of the drawings, the grill may be moved from place to place, may be inverted, or may be used with different utensils to fulfil the practical requirements of an electric heater for general cooking purposes. Furthermore, the device may be thus manipulated without any possibility of burning the hands. In Fig. 6 of the drawings I have shown the device in connection with a broiler 30. The body of this broiler is equipped with suitable legs and at its upper edge is formed with a flange 31 for snugly receiving the frame 10 of the grill. Arranged within the broiler is a rack 32 upon which the food to be broiled is placed. The grill is then inverted so that the reflector 23 thereof will be uppermost when the said grill is fitted within the flange 31. The grill will thus form a cover tightly closing the broiler, so that the heat will be retained therein while the reflector 23 will act to direct the heat from the heating unit down against the food upon the rack 32. Should it be desired to use the grill in the capacity of a toaster, the device may simply be placed right side up upon the broiler 30 which will then provide a stand for the grill. When the grill is so disposed, the reflector 23 will then act to direct the heat upwardly for toasting the bread laid upon the guard 24.

In Fig. 7 of the drawings, I have shown the broiler used in the capacity of a stand for the grill so that the grill may be used for toasting purposes, as just previously described, or may be used in connection with a steamer 33. This steamer is preferably deeper than the broiler and the bottom wall thereof is formed to fit upon the frame 10 of the grill, being preferably provided with a flange or bead to engage over the said frame. Closing the steamer is a suitable lid 35 and arranged within the steamer is a rack 36. The steamer is partially filled with water, when the food to be steamed is placed upon the rack 36. If desired, the rack 36 may be removed when the steamer 33 may be used for boiling various articles of food and in like manner, the rack 32 of the broiler may be removed when the grill may be used in connection with the broiler for baking various articles of food. I therefore provide an electric hand grill which may be manually manipulated for use in connection with different receptacles for the purpose of broiling, baking, boiling, steaming or toasting and consequently eliminate the necessity for separate devices for such purposes.

Having thus described the invention, what is claimed as new is:

1. An electric heating device including a split frame, insulating means carried thereby, a heating unit mounted upon the said means, a flanged plug having the ends of the frame engaged with the flange of the said plug for connecting the frame ends to secure the said means in position, and a locking member carried by the plug and provided with a flange to confront the flange of the plug for securing the frame ends in engagement with the plug.

2. An electric heating device including a split frame provided at its ends with lugs, insulating means carried by the frame, a heating unit mounted upon the said means, a notched plug having the said lugs of the frame engaged in the notches thereof for connecting the said frame ends and securing the said means in position, and a locking member carried by the plug for holding the frame ends engaged in said notches.

3. An electric heating device including a split frame, insulating means carried thereby, a heating unit supported by the said means, and a combined terminal receiving and handle supporting insulating plug connecting the ends of the frame and acting thereon to secure the said means in position upon the frame.

4. An electric heating device including a frame having free ends and adapted to be spread, insulating means carried by the frame and adapted to be removed therefrom when the frame is spread, a heating unit supported by said means, terminals for said heating unit, and means connecting the frame ends and holding the frame against spreading, the said last mentioned means carrying and insulating the said terminals with respect to each other as well as with respect to the frame.

5. An electric heating device including a frame having free ends and adapted to be spread, insulating means carried by the frame, a heating unit supported by said means, a handle for the frame, and means connecting the frame ends and holding the frame against spreading, the said last mentioned means connecting the handle with the frame.

6. An electric heating device including a frame having free ends and adapted to be spread, insulating slats extending between opposite portions of the frame and adapted to be removed therefrom when the frame is spread, a heating unit mounted upon the said slats, and means connecting the frame ends and holding the frame against spreading.

7. An electric heating device including a frame having free ends, insulating means carried by the frame, a heating unit mounted upon the said means, means connecting the frame ends and acting upon the frame to secure the said insulating means in position thereon, and means carried by said second mentioned means for clamping the frame ends in engagement therewith.

8. An electric heating device including a frame having free ends, insulating means carried by the frame, a heating unit mounted upon the said means, means connecting the frame ends and acting upon the frame for securing said insulating means in position thereon, a handle for the frame, and means carried by the said second mentioned means for locking the frame ends in engagement therewith and having the handle connected thereto to be secured by the said last mentioned means upon the said second mentioned means.

9. An electric heating device including a frame having free ends adapted to be spread, insulating means carried by the frame and adapted to be removed therefrom when the frame ends are spread, a heating unit supported by said means, and means connecting the frame ends and acting to hold the frame ends against spreading.

10. An electric heating device including a frame adapted to be spread, insulating means carried thereby and adapted to be removed from the frame when spread, a heating unit supported by said means, fastening means on the frame, and fastening means coöperating with said first mentioned fastening means for holding the frame against spreading.

11. An electric heating device including a frame having free ends and adapted to be spread, insulating means carried by the frame and adapted to be removed therefrom when the frame is spread, a heating unit supported by said means, fastening means on the frame, and fastening means coöperating with said first mentioned fastening means to connect the frame ends and hold the frame against spreading.

In testimony whereof I affix my signature.

JAY D. CRARY. [L. S.]